March 21, 1933.  H. LEHDE  1,901,876

METHOD AND APPARATUS FOR PHOTOGRAPHING MAGNETIC CURVES

Filed Sept. 5, 1928

Inventor
Henry Lehde
By Pozzy & Powers
Attorneys

Patented Mar. 21, 1933

1,901,876

UNITED STATES PATENT OFFICE

HENRY LEHDE, OF FORKS, NEW YORK

METHOD AND APPARATUS FOR PHOTOGRAPHING MAGNETIC CURVES

Application filed September 5, 1928. Serial No. 304,010.

This invention relates to a method and apparatus for photographing magnetic curves and more particularly to a device for photographing the hysteresis loop by means responsive to the magnetizing force and the resultant magnetic flux in a magnetic test sample.

The usual method of obtaining curves showing the relation between a magnetizing force and magnetic flux was to plot them from readings taken with an ammeter and a ballistic galvanometer or fluxmeter. This method was necessarily tedious, and the curves obtained were more or less of an approximation, depending on the number of points taken in plotting the curve.

The present invention proposes a direct photographing of the magnetic curves by combining the principles employed in the ammeter and in the Grassot fluxmeter in a single instrument to effect the deflection of a beam of light onto a photographic plate or the like, and in its general organization comprises means for deflecting a beam of light in one direction by an ammeter which is responsive to the magnetizing force applied to a test sample and means for deflecting the beam of light in a direction perpendicular to the direction it is deflected by the ammeter by a fluxmeter which is responsive to the resultant magnetic flux in the test sample, the resultant movement of the beam of light being recorded on a photographic plate or the like as a magnetic curve.

Inasmuch as the energy loss due to hysteresis in a sample of magnetic material is proportional to the area of the hysteresis loops, it is apparent that by obtaining photographs of the hysteresis loops and measuring their areas with a planimeter, that the hysteresis loss under various conditions of maximum flux density, temperature et cetera can be readily obtained.

It is also apparent that by a direct photographing of the hysteresis loop, the most accurate measurement of its area can be obtained, and correspondingly accurate observations can be made.

Figure 1:
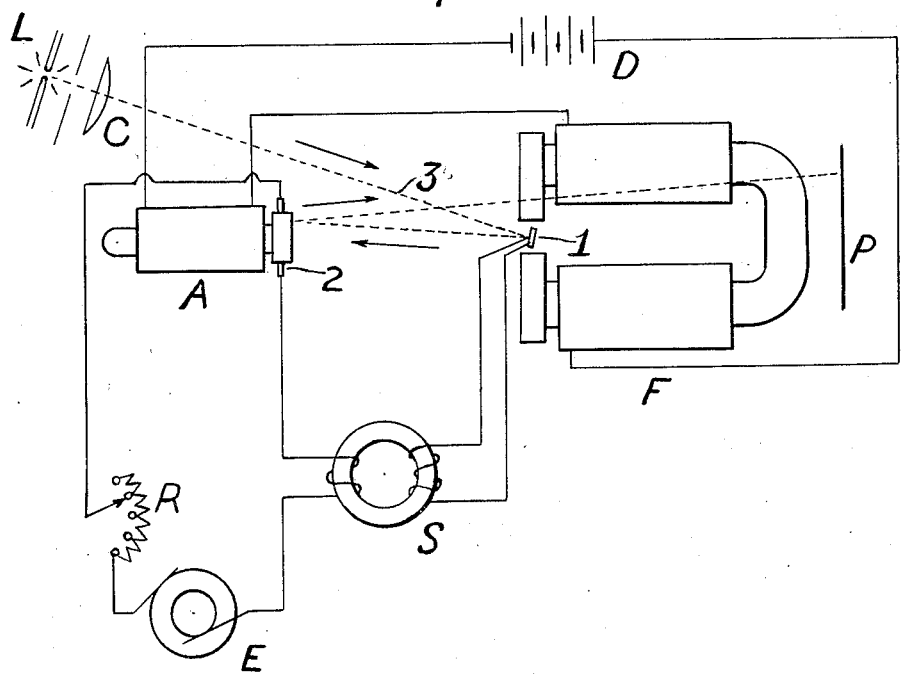
Figure 1 is a schematic plan view of an instrument embodying my invention.

As shown schematically in the drawing the letter A represents an ammeter unit and the letter F represents a fluxmeter unit, each of which have relatively powerful electro-magnets in place of the usual permanent magnets. These electro-magnets are shown connected to a source of direct current such as the battery D.

In order to trace out a magnetic curve on a screen or photographic plate by means of a beam of light, the beam must be deflected in one direction or plane by means responsive to the magnetizing force and in a perpendicular direction or plane by means responsive to the magnetic flux. The magnetic test sample S employed is of the usual ring type with primary and secondary windings. An alternating current of low frequency is sent through the primary winding of the test sample S from an alternator E and in this primary circuit is also included the moving coil 2 of the ammeter unit A and a variable resistance R. The moving coil 2 of the ammeter unit A is mounted for oscillation about a horizontal axis and is moved in response to the direction and intensity of the current in the primary circuit. The corresponding flux changes in the test sample S are detected by connecting the moving coil 1 of the fluxmeter unit F to the secondary winding of the test sample.

The fluxmeter is essentially a highly damped ballistic galvanometer having a weak suspending fiber which merely holds the movable coil in place and does not exert an appreciable torsional force on the coil. As is well known, high damping is obtained by keeping the resistance of the circuit to a low value. The coil 1, freely suspended in the fixed magnetic field produced by the electromagnet of the unit F, responds to the time integral of the voltage impressed upon it. By well known laws of electromagnetic induction, the integrated or additive value of the voltage induced in the secondary coil of the test sample is known to be proportional to the flux change taking place in the sample.

This coil 1 is mounted for oscillation about a vertical axis. To deflect the beam of light to trace the magnetic curve, an elongated mirror is attached to the ammeter coil 2 so as to oscillate with the coil about its horizontal axis and a round mirror is attached to the fluxmeter coil 1 so as to oscillate about its vertical axis. In practice shunts (not shown) may be used to protect the moving coils of the fluxmeter and the ammeter from excessive currents and to limit their deflections.

The beam of light indicated by the dotted lines 3 is generated by an electric arc L and passes through a converging lens C so that when the beam reaches the photographic plate or screen P it is converged to a point. This beam of light from the arc C is initially directed to the reflector or mirror carried by the coil 1 of the fluxmeter F and is thence directed to the reflector or mirror carried by the coil 2 of the ammeter from which it is reflected to the photographic plate P.

Figure 2:
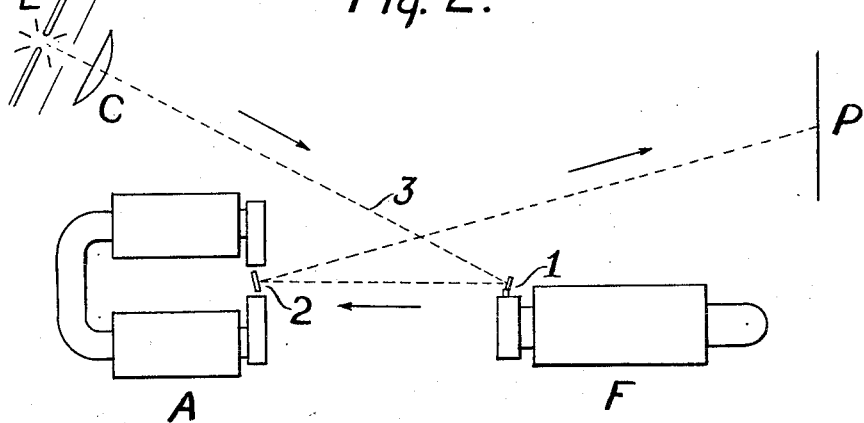
Figure 2 is a schematic side view thereof.

Both of the mirrors or reflectors are placed in substantially normal vertical positions and it is apparent on reference to Fig. 1 that the oscillation of the mirror carried by the fluxmeter coil 1 about its vertical axis will cause the beam of light to move in a horizontal direction across the photographic screen P after reflection from the ammeter mirror, and upon referring to Fig. 2 it will be apparent that the oscillation of the mirror carried by the coil 2 of the ammeter unit about its horizontal axis will cause the beam of light to travel in a vertical direction across the photographic plate P. By combining the vertical and horizontal movement of the beam of light in response, respectively, to an ammeter in circuit with the primary winding of the test sample and a fluxmeter in circuit with the secondary winding of the test sample, it is apparent that the beam of light will be directed in response to the magnetizing force and the resultant magnetic flux in the test sample and will describe a magnetic curve.

For every cycle of alternating current that passes through the windings of the test sample S, the beam of light will trace out one hysteresis loop on the photographic plate P, and successive cycles of alternating current will cause the beam of light to retrace the same loop. It is, therefore, obvious that upon directing the beam onto a screen in place of the photographic plate P that the hysteresis loop can be directly observed if the frequency of the alternating current is not too low. It has been found that the lowest frequency which can be employed and still result in a shape of loop which is clearly distinguishable is about five cycles per second. If, however, the beam of light is projected onto a phosphorescent screen, lower frequencies can be used and still obtain clear visibility.

Inasmuch as the hysteresis loss in a sample of magnetic material is proportional to the area of the hysteresis loop, when the instrument is calibrated, the hysteresis loss can be found by measuring the area of the hysteresis loop photographed. Thus, by photographing the hysteresis loops directly and measuring their areas by means of a planimeter the hysteresis loss under different conditions of flux density, temperature and other variable conditions can be obtained. In the same manner, the hysteresis loss in completed transformers can be found by connecting them in place of the test samples, and measuring the areas of their hysteresis loops by means of a planimeter as described.

In tracing the hysteresis loop, as the frequency of the alternating current is increased, eddy currents are induced in the magnetic test sample. The effect of this is to oppose the magnetizing current, and consequently the hysteresis loop is distorted, unless low frequencies are used.

The inertia of the moving coils 1 and 2 will also be a source of error if anything but a low frequency is used. For this reason it is desirable to design the coils with a low moment of inertia and their weight together with the mirrors carried thereby reduced as much as possible. In designing the coils, the deflecting and resisting torques on the same should be very high to make the coils quickly follow the variations in current and magnetic flux, this being attained by making the current densities in the moving coils and the flux densities in the air gaps as high as possible.

To photograph a magnetization curve, the sample S is demagnetized, and a gradually increasing direct current is sent through the primary winding of the sample S and the ammeter coil 2.

It is obvious that the principles embodied in the instrument shown and described can be applied in other ways to produce the same effects and hence the invention is not limited to the particular embodiment shown. For example, the beam of light can be made to fall first upon the ammeter mirror instead of the fluxmeter mirror. It is also obvious that by means of a more complicated arrangement, a single mirror could be employed, the same being oscillated about one axis by the magnetizing force and about a perpendicular axis by the resultant magnetic flux. Any source of radiation which will affect a photographic plate or cause phosphorescence can be employed in place of the electric arc and condensing lens shown in the drawing.

As a whole this invention provides a very simple and accurate instrument for directly recording curves showing the relation between the magnetizing force and magnetic flux in a test sample and permit the curves to be directly observed or photographed.

I claim as my invention:

1. An instrument for recording a magnetic curve of a magnetized element comprising an ammeter responsive to the magnetizing force applied to the magnetized element, a highly damped ballistic galvanometer responsive to the flux induced in said magnetized element by said magnetizing force, and means responsive to the combined action of said elements for directing a beam of light to traverse a surface.

2. An instrument for recording a magnetic curve of a magnetized element comprising an ammeter responsive to the magnetizing force applied to said magnetized element, a highly damped ballistic galvanometer in the secondary circuit of said magnetized element, reflecting means actuated by said elements, and means for causing a beam of light to be reflected by said reflecting means to traverse the surface on which said curve is recorded.

3. An instrument for recording a magnetic curve of a magnetized element comprising an ammeter in the primary circuit of said magnetized element, a reflector oscillated about an axis by said ammeter, a highly damped ballistic galvanometer in the secondary circuit of said magnetized element, a second reflector oscillated about an axis perpendicular to the axis of said ammeter reflector by said highly damped ballistic galvanometer and means for directing a beam of light across said reflectors and thence to a surface on which the curve is recorded.

4. The method of recording a magnetic curve on a surface which consists in producing relative movement between a beam of light and said surface to record one ordinate of said curve and simultaneously moving said beam of light relative to said surface by a highly damped ballistic galvanometer having a movable coil in a fixed magnetic field and moving said coil responsive to the magnetic flux in a magnetized element.

5. The method of recording a magnetic curve on a surface which consists in producing relative movement between a beam of light and said surface to record one ordinate of said curve and simultaneously moving said beam of light relative to said surface by a highly damped ballistic galvanometer having a floating coil in a fixed magnetic field, and moving said coil responsive to the time integral of voltage induced in a coil associated with a magnetized element by a change in magnetic flux in said magnetized element.

6. An instrument for recording magnetic curves of a magnetized element comprising two movable coils placed in fixed magnetic fields, one of said coils being arranged to respond to the magnetizing force applied to said magnetized element, and the other of said coils being freely suspended and thereby arranged to respond to the magnetic flux in said magnetized element and means responsive to the combined action of said movable coils for recording said curves.

7. An instrument for recording magnetic curves of a magnetized element, comprising two movable coils placed in fixed magnetic fields, one of said coils being arranged to respond to the magnetizing force applied to said magnetized element and the other of said coils being freely suspended and thereby arranged to respond to the magnetic flux in said magnetized element and means responsive to the combined action of said coils for causing a beam of light to record said curves.

8. An instrument for recording magnetic curves of a magnetized element, comprising two movable coils with attached mirrors, said coils being placed in fixed magnetic fields, one of said coils being responsive to the magnetizing force applied to said magnetized element and the other of said coils being freely suspended and thereby responsive to the magnetic flux in said magnetized element, and means for directing a beam of light from one of said mirrors to the other of said mirrors and thence to the surface on which said curves are recorded.

9. An instrument for recording magnetic curves of a magnetized element comprising two movable coils with attached mirrors, said movable coils being placed in fixed magnetic fields, a winding carrying the magnetizing current applied to said magnetized element, one of said coils being in circuit with said winding, a second winding associated with said magnetized element, the other of said coils being freely suspended and in circuit with said second winding and means for directing a beam of light from one of said mirrors to the other of said mirrors and thence to the surface on which said curves are recorded.

In testimony whereof I affix my signature.

HENRY LEHDE.